(12) United States Patent
Hyun et al.

(10) Patent No.: US 10,270,073 B2
(45) Date of Patent: Apr. 23, 2019

(54) ORGANIC/INORGANIC COMPOSITE COATING POROUS SEPARATOR AND SECONDARY BATTERY ELEMENT USING SAME

(71) Applicant: HANWHA TOTAL PETROCHEMICAL CO., LTD., Seosan-si (KR)

(72) Inventors: Jae Yong Hyun, Dangjin-si (KR); Jin A. Yoo, Incheon (KR); Do Hoon Lee, Seosan-si (KR); Chang Hyun Choi, Seoul (KR)

(73) Assignee: Hanwha Total Petrochemical Co., Ltd., Seosan-si (KR)

( * ) Notice: Subject to any disclaimer, the term of this patent is extended or adjusted under 35 U.S.C. 154(b) by 0 days.

(21) Appl. No.: 15/240,567

(22) Filed: Aug. 18, 2016

(65) Prior Publication Data

US 2016/0359155 A1 Dec. 8, 2016

Related U.S. Application Data

(63) Continuation of application No. 14/418,059, filed as application No. PCT/KR2013/010038 on Nov. 7, 2013, now abandoned.

(30) Foreign Application Priority Data

Feb. 12, 2013 (KR) .......................... 10-2013-0015059

(51) Int. Cl.
  *H01M 2/16* (2006.01)
  *H01M 2/14* (2006.01)
  (Continued)

(52) U.S. Cl.
  CPC .......... *H01M 2/145* (2013.01); *H01M 2/166* (2013.01); *H01M 2/1686* (2013.01); *H01M 2/18* (2013.01);
  (Continued)

(58) Field of Classification Search
  CPC .. H01M 2/1686; H01M 2/1245; H01M 2/166; H01M 2/1606; H01M 2/1646
  See application file for complete search history.

(56) References Cited

U.S. PATENT DOCUMENTS 2,954,331 A * 9/1960 Abbott ..................... C25D 3/38
                                                       205/296
5,300,542 A * 4/1994 Gopalkrishnan, Sr. .....................
                                                   C04B 24/2664
                                                       523/130
(Continued)

FOREIGN PATENT DOCUMENTS

JP         5110599 B2       12/2012
KR     10-2012-0052100       5/2012
(Continued)

*Primary Examiner* — Jeremiah R Smith
(74) *Attorney, Agent, or Firm* — Harness, Dickey & Pierce, P.L.C.

(57) ABSTRACT

There is provided an organic/inorganic complex coating porous separator including a porous substrate, and an organic/inorganic complex coating layer formed in a single layer or multiple layers on a single surface or both surfaces of the porous substrate or at least a part of a pore portion of the porous substrate using a coating solution comprising a binder dispersed or suspended in a certain size and selectively comprising inorganic particles, and a secondary battery including the same. According to the present invention, since the coating solution comprising the binder dispersed in a certain size or less in a solvent is coated/dried on the porous substrate, a organic/inorganic complex coating porous separator having excellent air permeability and adhesive strength and a secondary battery including the organic/inorganic complex coating porous separator are provided.

17 Claims, 2 Drawing Sheets

(51) Int. Cl.
   *H01M 10/052* (2010.01)
   *H01M 10/0525* (2010.01)
   *H01M 2/18* (2006.01)

(52) U.S. Cl.
   CPC ..... *H01M 10/052* (2013.01); *H01M 10/0525* (2013.01); *H01M 2/1606* (2013.01); *H01M 2/1646* (2013.01); *H01M 2220/20* (2013.01); *H01M 2220/30* (2013.01)

(56) References Cited

U.S. PATENT DOCUMENTS

| | | | |
|---|---|---|---|
| 7,662,517 B2 | 2/2010 | Lee et al. | |
| 8,372,475 B2 | 2/2013 | Kim et al. | |
| 2003/0232244 A1* | 12/2003 | Birke | H01M 2/166 429/185 |
| 2004/0234862 A1* | 11/2004 | Macglashan | H01M 2/1626 429/247 |
| 2006/0024579 A1* | 2/2006 | Kolosnitsyn | H01M 4/13 429/209 |
| 2010/0270497 A1* | 10/2010 | Hezeque | C22C 1/0483 252/182.1 |
| 2011/0171535 A1* | 7/2011 | Ohinshi | H01M 10/0562 429/247 |
| 2012/0015228 A1 | 1/2012 | Yoon et al. | |
| 2012/0015254 A1 | 1/2012 | Lee et al. | |
| 2012/0094184 A1* | 4/2012 | Abe | H01G 9/02 429/251 |
| 2012/0164513 A1* | 6/2012 | Peng | C08G 83/005 429/144 |
| 2013/0130092 A1* | 5/2013 | Roth | H01M 2/1606 429/144 |
| 2013/0280584 A1* | 10/2013 | Matsumura | H01M 2/166 429/144 |
| 2015/0030906 A1 | 1/2015 | Amin-Sanayei et al. | |

FOREIGN PATENT DOCUMENTS

| | | | | |
|---|---|---|---|---|
| KR | 10-2012-0094003 | | 8/2012 | |
| KR | 10-2012-0108686 | | 10/2012 | |
| KR | 10-2012-0111652 | | 10/2012 | |
| WO | WO 2012/019626 | * | 2/2012 | .......... H01M 2/1606 |
| WO | WO 2012/073996 | * | 7/2012 | ............ H01M 2/162 |
| WO | WO-2013126490 A1 | | 8/2013 | |

* cited by examiner

ORGANIC/INORGANIC COMPOSITE COATING POROUS SEPARATOR AND SECONDARY BATTERY ELEMENT USING SAME

CROSS-REFERENCE TO RELATED APPLICATIONS

This application is a continuation of U.S. patent application Ser. No. 14/418,059 filed Jan. 28, 2015, which is a National Stage of International Application No. PCT/KR2013/010038 filed Nov. 7, 2013, and claims the benefit and priority of Korean Patent Application No. 10-2013-0015059 filed Feb. 12, 2013. The entire disclosures of the above-referenced applications are incorporated herein by reference.

TECHNICAL FIELD

The present invention relates to a separator used in a secondary battery and more particularly, to a porous separator in which an organic/inorganic complex coating layer is applied to a porous substrate, and a secondary battery including the same.

BACKGROUND ART

Lithium ion secondary batteries are basically comprised of an anode, a cathode, a separator, and an electrolyte, and have been widely applied to small-sized electronic devices, for example, mobile phones, notebook computers, and the like, as high energy density energy storage devices which can be charged and discharged by reversible conversion between chemical energy and electric energy. In recent years, in order to deal with environmental issues, high oil prices, and energy efficiency and storage, application of the lithium ion batteries has been rapidly expanded to hybrid electric vehicles (HEV), plug-in EV, e-bikes, and energy storage systems (ESS).

Although the lithium ion batteries are stable electrochemical devices insulated by separators, short circuit between an anode and a cathode may be caused by internal or external abnormalities of the batteries or by shocks and there is a possibility of heating and explosion. Therefore, ensuring thermal/chemical stability of the separators as insulators is the most important consideration.

Further, in recent years, along with an increasing demand for high capacity and high power output, stability of batteries, that is, stability in explosion and fire, becomes more important. In order to ensure stability of a battery, voltage, current, impedance, temperature, and the like, of a battery cell are generally controlled by an electronic protection circuit or a battery management system (BMS), thereby such attempts responding to abnormalities, such as over charge and over current, of the battery have been made.

A polyolefin-based separator commercially used a lot in lithium secondary batteries is a porous film that prevents short circuit between an anode and a cathode and provides pores serving as a passage of lithium ions. Polyolefin-based separators manufactured by a wet method or a dry method have been widely used commercially.

The wet method is a method including mixing, melting, extruding inorganic particles or oil components with polyolefin in an extruder to prepare a sheet, and forming a thin film by simultaneous or successive biaxial orientation using a roller or a tenter, and extracting the inorganic particles or oil components with a solvent to form a porous film. In this method, polyethylene (PE) among polyolefins is mainly used to form a film. On the other hand, the dry method is a method of forming a porous film by melting and extruding a resin and then orienting the resultant with a roller or a tenter without using an organic solvent, and generally uses polypropylene (PP) and may use polyethylene as necessary.

In a process for preparing a porous separator, except a non-woven separator, a polyolefin porous separator, in which a porous substrate is generally prepared by a film orientation process, cannot avoid a change in volume such as contraction or fusion of its separator when a temperature of a battery is increased to 100° C. or more due to an internal or external stimulus, and, thus, an electrical short circuit between an anode and a cathode may cause explosion. Further, if the separator is broken due to dendrite growth within the battery, an internal short circuit may induce explosion of the battery. There is disclosed a coating separator in which in order to suppress thermal contraction caused by high temperature and instability of the battery caused by dendrite, inorganic particles together with a binder are coated on one or both surfaces of the substrate of the porous separator, and, thus, the inorganic particles suppresses a contraction rate of the substrate and the separator is more stable due to the inorganic coating layer.

In this case, if an organic/inorganic coating layer applied to the porous substrate is not uniformly coated on the porous substrate, when the coating layer is assembled in a secondary battery or within the battery, a part of the inorganic coating layer can be easily separated due to coating defects on the surface. Such separation can decrease stability of the battery. Therefore, a coating system for more uniform organic/inorganic coating is needed to form a uniform inorganic coating layer and ensure an excellent battery property.

As a conventionally well-known technology of an organic/inorganic coating separator, a method for preparing an organic/inorganic coating porous separator by coating organic/inorganic slurry (PVDF-CTFE/$BaTiO_3$ or PVDF-CTFE/$Al_2O_3$) with an organic solvent is described in Korean Patent No. 10-0775310. A process of this patent is identical with a conventional electrode solution molding process using a great amount of an N-methylpyrrolidone (NMP) solvent or acetone as a dispersion medium.

Typically, an organic solvent dissolves a binder (PVDF-CTFE) to provide an excellent adhesive property between inorganic particles in powder form when it evaporates. Slurry prepared from a binder solution in an organic solvent provides interconnectivity among a porous substrate, an organic/inorganic coating layer, and inorganic particles within the inorganic coating layer. The components connected as such can endure contraction of a porous separator caused by heating and an external physical shock (event) without losing the interconnectivity during a battery is assembled and operated.

Further, inorganic particles typically has a certain distribution size, and when a binder is completely dissolved in a solvent and the binder has an excellent compatibility with surfaces of the inorganic particles, as the solvent evaporates, the binder sufficiently covers the surfaces of the inorganic particles. Thus, a sufficient adhesive strength between the inorganic particles can be obtained, and even if the binder completely dissolved in the solvent does not have a high wettability with respect to a porous substrate, the binder solution infiltrates into a porous structure and has a sufficient physical adhesive strength with respect to the porous substrate. However, in this case, in order for the binder solution to easily infiltrate into pores of the porous structure and exhibit a relatively sufficient adhesive strength between the inorganic substance and a surface of the porous substrate, the binder in a sufficient amount may be needed, or gel is formed as the solvent volatilizes. Thus, a solvent-impermeable space is generated, resulting in non-uniformity of an organic/inorganic coating layer, which may cause deterioration in battery property. Further, if a concentration of the binder in slurry is increased, a viscosity of the slurry is highly increased, which makes it difficult to prepare an organic/inorganic complex layer of a thin film, and a drying process may require a high temperature. If a low viscosity of the slurry is maintained, an adhesive strength with respect to a porous substrate or between inorganic substances is decreased. Thus, the inorganic particles are easily separated. For this reason, in many cases, a binder dispersed in a certain size in a solvent has been used in the form of an emulsion or suspension, and a binder dispersed in a certain size in an organic (oil-based) solvent may be used, and particularly, a binder dispersed in a certain size in water-based solvent (water) is preferred since it is eco-friendly and has many processing advantages in coating inorganic particles.

However, only with a typically dispersed binder, a sufficient adhesive strength between the inorganic particles or between the inorganic particles and the porous substrate cannot be obtained.

As described above, a coating method based on a binder composition soluble in an organic solvent has some problems. Firstly, a binder soluble in an organic solvent is formed into gel as the organic solvent volatilizes during a drying process, and, thus, a solvent-impermeable space is generated, resulting in non-uniformity of an organic/inorganic coating layer. Thus, a battery property may be reduced. In order to overcome this problem, the binder needs to undergo a secondary drying process in a vacuum at a glass transition temperature (Tg) or higher. If a residual solvent is present in a product due to insufficient drying, a part of the binder is dissolved and gel may be formed. Thus, if a surface of the coating layer becomes sticky, dust from the outside or unnecessary particles may adhere thereto and a defect rate of products may be increased due to adhesion between coating layers or with a substrate when a product is wrapped. Secondly, if a concentration of the binder in the slurry is increased, a viscosity of the slurry is highly increased, which makes it difficult to prepare an organic/inorganic complex layer of a thin film. Further, since air permeability is low and a boiling point is high, a drying process requires a high temperature. Thirdly, if a low viscosity of the slurry is maintained, an adhesive strength with a porous substrate or between inorganic substances is decreased. Thus, the inorganic particles are easily separated. Fourthly, in a process based on an organic solvent, a dry zone of a drying line is elongated due to a critical explosion limit while being dried, and, thus, it is difficult to improve a machining speed. Fifthly, since the organic solvent has volatility, from the moment the slurry is exposed to the external environment, the organic solvent continuously volatilizes. Therefore, a concentration and a rheological property of the slurry are changed due to evaporation of the solvent while the slurry is prepared, transferred, and coated, which may affect a coating quality of a final product. Sixthly, when a coating separator is prepared, risk factors for safety, healthy, and environment are inherent. The organic solvent has toxicity, inflammability, and volatility due to its characteristics. In order to lower the risks of the organic solvent and reduce environmental pollution, the organic solvent needs to be specially prepared and managed. As such, the preparation method of the organic/inorganic coating separator using the binder soluble in the organic solvent has limitations in view of characteristics of the battery and characteristics of the process.

As a method for improving an adhesive strength between a porous substrate and a coating layer, Korean Patent Laid-open Publication No. 10-2012-0052100 describes a technology of preparing a coating separator having two coating layers, comprising: forming an organic/inorganic complex layer by casting a slurry, in which styrene-butadiene rubber (SBR) and carboxyl methyl cellulose (CMC) are dissolved in acetone as an organic solvent, onto a polyethylene porous film; and performing an electric radiation on a polymer compound solution. However, if an organic/inorganic complex layer is formed by this method, the above-described problems of the coating method using the organic solvent also occur. There has been suggested a technology of forming a coating separator in three layers by radiation onto an inorganic coating layer in order to solve the problem caused by separation of inorganic substances due to a low adhesive strength with a substrate. However, in this case, since a film is formed by radiation, it is difficult to overcome the problem of a thickness control of a coating layer at this point in time where a coating separator is demanded to be thinner. Further, due to low uniformity in pore, a current cannot be uniformly distributed but concentrated on a single point when being applied to a battery, and, thus, partial heating, degradation, and explosion may occur. Therefore, it does not provide a fundamental technical suggestion of an organic/inorganic coating separator.

In order to solve a problem that coating materials are easily separated due to a low adhesive strength between a porous substrate and a coating layer when an organic/inorganic coating separator is prepared by the conventional methods, Korean Patent No. 10-1125013 describes a method for preparing a cross-linked ceramic-coated separator using a water-soluble ionic polymer. This method also uses an ionic polymer which can be dissolved in water, but the ionic polymer is not dispersed in water but completely dissolved in water, and, thus, it cannot avoid confinement of the solvent. Since dimethylacetamide as an organic solvent is used 15 times more than water, it does not provide a fundamental suggestion of a coating method using water. In order to induce chemical crosslinking after coating for the purpose of improving an adhesive strength with a substrate, a crosslinking agent and an initiator need to be added together with the organic solvent during a preparation process of slurry, and during a drying process, a heat or UV treatment for 20 hours or more is essentially required. However, if a crosslinking agent and an initiator are added to a slurry solution, before the slurry is applied to the porous substrate, the slurry is partially cross-linked by itself by heat and energy externally applied while a coating solution is stored and transferred, resulting in solidification of the slurry. Thus, uniformity of the coating separator is finally decreased. Further, since a heat treatment and a UV treatment are needed a long time even during a drying process, production yield may be very limited, and a porous substrate of a thin film may be damaged due to high temperature/high energy during the drying process, which may cause deterioration in property and air permeability.

DISCLOSURE

Technical Problem

The present invention is contrived to solve the conventional problems as described above. An object of the present invention is to provide a separator capable of improving thermal and chemical stability of a porous substrate by forming an organic/inorganic complex coating porous layer excellent in air permeability and adhesive strength by coating the porous substrate with a coating solution in which a binder and selectively added inorganic particles are dispersed in a specific size, and exhibiting a sufficient adhesive strength between the inorganic particles or between the inorganic particles and the substrate if the inorganic particles are contained, and a secondary battery using the same.

Technical Solution

An organic/inorganic complex coating porous separator according to the present invention comprises a coating layer coated with a coating solution which contains a binder and selectively inorganic particles dispersed in the form of particle having a certain particle size in a solvent, in a single layer or multiple layers on a single surface or both surfaces of a porous substrate or at least a part of a pore portion of the porous substrate.

The binder used in the present invention refers to two types of binders including an oil-based binder dispersed in a certain size in an organic solvent and a water-based binder dispersed in a certain size in water. Herein, the expression "dispersed in a certain size" means that binder particles are dispersed with a certain distribution size and are present as an emulsion or a suspension at the time of initial polymerization or by a post-process. An adhesive strength between the inorganic particles or between the inorganic particles and the substrate can be more effectively regulated by regulating a particle size of the dispersed binder by a temperature, a pH, or a concentration of an emulsifier during a preparation process.

In the present invention, the term "certain size" of the binder particles means that a mean particle diameter $d_{50}$ of the binder is a half or less of a mean diameter of the inorganic particles and also less than one and a half times a mean pore diameter of the porous substrate. When this condition is satisfied, a specific surface area of the binder is increased and the binder effectively infiltrate into an inner surface of the porous substrate, thereby effectively improving an adhesive strength between the porous substrate and the binder on an outer surface and an adhesive strength between the substrate and the inorganic particles during a drying process. Therefore, an adhesive strength between the binder and the substrate is more effectively improved, and if the inorganic particles are contained, a sufficient adhesive strength between the inorganic particles or between the inorganic particles and the substrate can be exhibited. If a binder having a specific particle size is used as illustrated in the present invention, it is possible to obtain a higher adhesive strength between a binder and a substrate and a higher adhesive strength between inorganic particles or between the inorganic particles and the substrate, as compared with a case of using a binder which can be chemically crosslinked and ionically crosslinked.

The present invention can be applied, without limitation, to a coating separator for secondary battery that does not contain inorganic particles. If a coating solution does not contain inorganic particles, when a mean particle diameter $d_{50}$ of a binder is less than one and a half times a mean pore diameter of the porous substrate, an excellent adhesive strength with respect to the substrate can be exhibited.

In the present invention, if a coating solution uses inorganic particles and a binder, an additional binder or a dispersion agent (low molecular or high molecular dispersion agent) for dispersing the inorganic particles or an antifoaming/defoaming agent, a wetting agent, a leveling agent, a rheology modifier, and the like, for improving a coating property of the coating solution may be additionally contained, but preferably, for battery properties, such additives may be added as small as possible.

According to the present invention, when the coating solution is coated on the porous substrate, a polyolefin-based porous film having low surface energy has a low wettability, which may cause non-uniformity in coating. For uniformity in coating, there may be used a surface treatment technology such as a corona, plasma, or high-energy radiation treatment generally used to increase surface energy and a surface roughness of the porous substrate. By such a surface treatment, the coating solution can be uniformly coated on the porous substrate with more efficiency. However, according to the present invention, even if the surface treatment is not carried out, high air permeability and adhesive strength can be obtained, but if a surface treatment is carried out, higher permeability and adhesive strength can be obtained, and it is more advantageous to carry out the surface treatment in order to improve wettability with respect to an electrolyte within the battery.

According to the present invention, in the case of using inorganic particles, a preferable exemplary embodiment of a method for preparing a separator comprises:

(a) a step of dispersing inorganic particles by mixing the inorganic particles with a solvent;

(b) a step of preparing a coating solution by mixing a binder in the form of particle with the mixed solution obtained in the step (a);

(c) a step of coating and drying the coating solution obtained in the step (b) on one or more regions selected from the group consisting of a one surface, both surfaces of a porous substrate, and at least a part of a pore portion of the substrate in a single layer or multiple layers.

In the present invention, when the coating solution is coated on the porous substrate, a coating method is not specifically limited, and various coating methods such as typically used dip coating, die coating, Gravure coating, comma coating, may be used.

Hereinafter, the present invention will be explained in more detail.

<Porous Separator>

The porous separator of the present invention includes a porous separator in which an organic/inorganic complex coating layer is formed in a single layer or multiple layers on one or more regions selected from the group consisting of a single surface, both surfaces, and at least a part of a pore portion of a porous substrate using the porous substrate and a coating solution containing a binder dispersed in a solvent and selectively added inorganic particles.

The porous substrate may employ any porous substrate generally used in an electrochemical device such as a lithium secondary battery. The porous substrate may include, for example, a film or non-woven fabric formed using one or a mixture of two or more polymer compounds such as high-density polyethylene, low-density polyethylene, linear low-density polyethylene, ultra high-molecular weight polyethylene, polypropylene, polyethylene terephthalate, polybutylene terephthalate, polyester, polyacetal, polyamide, polycarbonate, polyimide, polyetherether ketone, polyether sulfone, polyphenylene oxide, polyphenylene sulfide, and polyethylene naphthalene.

The porous substrate may be prepared to have a thickness ranging from 1 to 100 μm, and preferably, 1 to 30 μm. Along with a recent trend of high power output/high capacity of a battery, it is advantageous to use a thin film as the porous substrate. A pore diameter of the porous substrate is in a range of 0.01 to 50 μm, and a porosity is 5 to 90% and preferably 20 to 80%. However, these numerical ranges can be easily modified depending on an embodiment or as necessary.

A pore of the porous substrate may have various pore structures. If any one of a mean pore diameter measured using a porosimeter or a mean pore diameter observed from an FE-SEM image satisfies the above-described conditions, it can be included in the present invention. Herein, as for an uniaxially oriented separator manufactured by a dry method, a central pore diameter in a TD direction rather than an MD direction in an FE-SEM image becomes a reference (refer to FIG. 1), and as for other porous substrates (for example, a wet PE separator) having a network structure, a pore diameter measured with a porosimeter typically becomes a reference, but the present invention is not limited thereto.

If the coating solution contains inorganic particles, the binder enables adhesion and fixation between the inorganic particles and between the inorganic particles and the surface of the porous substrate, thereby preventing physical deformation and deterioration of properties of the porous substrate.

The binder refers to a binder in the form of an emulsion or suspension in which particles of a polymer compound are dispersed in an organic solvent or water, and specifically, the dispersed binder is in an emulsion form or a suspension form of which a mean pore diameter $d_{50}$ is a half or less of a mean pore diameter $d_{50}$ of the inorganic particles and also less than one and a half times a mean pore diameter $d_{50}$ of the porous substrate. For example, the binder may be one or a mixture of two or more selected from the group consisting of latex, emulsions and suspensions formed by dispersing polymer compounds, such as polystyrene-based, styrene butadiene-based, nitrile-based, polyvinyl chloride (PVC)-based, polyolefin-based, acryl-based, acetate-based, polyvinylidene fluoride (PVDF)-based, ethylene-vinyl acetate (EVA)-based, polyvinyl butyral-based, polytetrafluoroethylene (PTFE)-based, polyimide-based, polyethylene oxide-based, cellulose-based, polyvinyl alcohol-based, and starch-based polymers or copolymers, in an organic solvent or a water-based solvent such as water.

As a particle diameter of the binder is decreased, a specific surface area is increased and an amount of the binder passing through the porous substrate is increased. Thus, it is more effective in increasing an adhesive strength between the inorganic particles and between the substrate and the inorganic particles. When a mean particle diameter $d_{50}$ of the binder is a half or less of a mean diameter of the inorganic particles and also less than one and a half times a mean pore diameter of the porous substrate, an organic/inorganic complex coating separator having an excellent adhesive strength as an object of the present invention can be obtained.

For example, as for a porous separator typically used in a secondary battery, a PE separator formed by a wet method and a PP separator formed by a dry method have mean pore diameters of 100 to 700 nm (400 to 700 nm in the case of using a three component system and 100 to 300 nm in the case of using a two component system, and a pore diameter may vary depending on a film forming condition, the pore diameter described herein is not provided to limit a pore diameter) and 50 to 200 nm, respectively. An effective mean particle diameter of the binder for each film may vary. For example, in an uniaxially oriented PP separator manufactured by a dry method, a width of a pore in a TD direction may be in a range of about 50 to about 200 nm, and, thus, a binder having a mean particle diameter of 100 nm or less is preferred. In particular, a binder which has a mean particle diameter of 100 nm or less and can be bonded by ions or bonded by a crosslinking agent exhibited a more effective adhesive strength and a thermal property between the inorganic particles and the substrate, but it was found that if a mean particle diameter is great, an adhesive strength is decreased.

In the present invention, as the dispersed binder, binders of many kinds having different mean particle diameters may be used. In this case, if a mean particle diameter of any one of the binders satisfies the above-described conditions, it is included in the present invention.

In the coating solution of the present invention, besides the binder, in order to more effectively improve an adhesive strength with respect to the substrate and a coating property by inducing an attraction force between the binder and the polymer, as a second organic binder to be dissolved in the solvent, phosphoric ester, phosphoric acryl-based copolymer, modified polyacrylate-based copolymer, modified polyacrylic acid-based copolymer, polyester amine amide-based copolymer, polycarboxylic acid-based copolymer, polyalkylol amino amide-based copolymer, siloxane- and acryl-based copolymer, siloxane- and carboxylic acid-based copolymer, polyalkoxylate-based copolymer, acryl- and ether-based copolymer, and metallic salts thereof may be used, and one or two or more of them may be used.

The inorganic particles used in the coating solution of the present invention may employ any inorganic particles typically used in preparing a conventional coating separator for battery. The inorganic particles may include one or a mixture of two or more substances of $SnO_2$, $BaTiO_2$, $Al_2O_3$, $CeO_2$, $SiO_2$, $TiO_2$, $Li_3PO_4$, NiO, ZnO, MgO, $Mg(OH)_2$, CaO, $ZrO_2$, $Y_2O_3$, and talc, and the inorganic particles may have a shape such as a sphere shape, a plate shape, or an irregular shape.

The inorganic particles are not limited in diameter, but for preparing slurry with good dispersion stability and for forming a coating layer having a uniform thickness, the inorganic particles may have a diameter of preferably 0.001 to 10 μm, and most preferably 0.1 to 5 μm. If a mean diameter of the inorganic particles is less than 0.01 μm, dispersibility of the inorganic particles may be decreased, or the inorganic particles may be distributed within the already-formed pores, and, thus, air permeability may be decreased. If a diameter of the inorganic particles is more than 5 μm, a thickness of the organic/inorganic complex coating layer is increased, resulting in deterioration in mechanical property, or the possibility of an internal short circuit during charge and discharge of the battery is increased due to the excessively large pores. Further, due to an increase in overall thickness of the organic/inorganic complex coating separator, there may be a limitation in manufacturing a middle or large-sized battery cell which is thin and has high capacity.

As for the inorganic particles, various inorganic particles having different mean particle diameters may be mixed and used. If a particle distribution of any one kind of inorganic particles satisfies the above-described conditions, it is included in the present invention. Further, a diameter of the inorganic particles can be measured using a device configured to measure a particle diameter and distribution using a laser or a light scattering method.

In the coating solution used in the present invention, for the purpose of regulating viscosity or improving ionic conductivity and for the purpose of a coating property or dispersibility of the inorganic particles, a low-molecular or high-molecular organic compound soluble in the solvent may be further contained in addition to the binder.

In the separator of the present invention, the coating layer can be formed with a coating solution that contains only particles of the binder but not contains the inorganic particles under the above-described conditions. In this case, if the binder satisfies a condition that a mean particle diameter thereof is less than one and a half times a mean pore diameter of the porous substrate, a coating separator having an excellent adhesive strength can be prepared.

In the coating solution of the present invention, if inorganic particles are used, preferably, a weight ratio of the inorganic particles:the binder (P/B ratio) is 4:1 to 140:1. If a weight ratio of the inorganic particles to the binder is less than 4:1 an amount of the binder resin with respect to the inorganic particles is great, and, thus, air permeability is reduced and performance of a battery deteriorates. If a weight ratio is more than 140:1 and an amount of the binder is small and an amount of the inorganic particles is too great, an adhesive strength between the inorganic particles or between the porous substrate and the inorganic particles is decreased and separation may occur.

In the separator of the present invention, preferably, the coating layer has a thickness of 0.1 to 50 μm, a pore diameter of 0.001 to 10 μm, and a porosity of 30 to 80%.

If a pore diameter is less than 0.001 μm, or porosity is less than 30%, pores are filled with a small amount of an electrolyte, and, thus, a lithium ion transfer capability is decreased or performance of a cell deteriorates. If a pore diameter is more than 10 μm, or porosity is more than 80%, a mechanical property of the porous separator may deteriorate.

In the separator of the present invention, the method for coating the coating solution on the porous substrate may employ a typical coating method known in the art. For example, various processes such as dip coating, die coating, roll coating, comma coating, Gravure coating, or a combination thereof may be used.

<Preparation Method of Porous Separator>

The organic/inorganic complex porous separator according to the present invention can be prepared by a typical method known in the art, and a preferable exemplary embodiment of using inorganic particles comprises:

(a) a step of dispersing inorganic particles by adding and mixing the inorganic particles with a solvent;

(b) a step of preparing a coating solution by adding and mixing a binder in the form of particle with the mixed solution obtained in the step (a);

(c) a step of coating and drying the coating solution obtained in the step (b) on one or more regions selected from the group consisting of a one surface, both surfaces of a porous substrate, and at least a part of a pore portion of the substrate in a single layer or multiple layers.

In the step (a), the inorganic particles may be dispersed using a typical dispersion method known in the art with, for example, an ultrasonic homogenizer, a ball-mill, a disperser, a mixer, and the like, and particularly preferably a ball-mill. In this step, a dispersion processing time may vary depending on a capacity, and preferably, it is 1 to 20 hours. A particle diameter of the crushed inorganic particles can be controlled depending on a size of a bead used for the ball-mill and a time for the ball-mill, and preferably, it is about 0.001 to about 10 μm as described above. In this step, a particle dispersion state may deteriorate depending on a size, a shape and a chemical structure of a surface of a inorganic particles. If a polymer dispersion agent is added as necessary, the inorganic particles can be more effectively dispersed. Generally, an amount of the dispersion agent may vary depending on a size, a chemical structure, and a surface area of inorganic particles, but appropriately, it is 0 to 3 parts by weight with respect to 100 parts by weight of the inorganic particles.

In the step (b), the organic/inorganic complex coating solution is prepared by adding the binder to the mixed solution in the form of slurry in which the inorganic particles are dispersed.

In the step (c), before the porous substrate is coated with the coating solution, a wetting agent for improving wettability of the organic/inorganic complex coating solution with respect to the porous substrate, a leveling agent for improving surface flatness of the coating layer, an adhesion promoter for improving an adhesive strength between the separator substrate and the coating solution, an antifoaming and defoaming agent, and additives applicable for improving a coating property such as a thickener, a rheology additive, and a UV absorber may be selectively added in appropriate amounts depending on viscosity or surface energy of the finally obtained coating solution. A kind of the additives can be appropriately selected and used depending on a desired coating method and a coating characteristic.

In the step (c), the final coating separator according to the present invention can be prepared by coating and drying the coating solution on the porous substrate. In this step, the method for coating the coating solution on the porous substrate may employ a typical coating method known in the art. For example, by dip coating, die coating, roll coating, comma coating, Gravure coating, bar coating, or a combination thereof, the coating layer of a single layer or multiple layers may be coated on a single surface or both surfaces, and at least a part of the pore portion of the porous substrate.

<Electrochemical Device Comprising Porous Separator>

In an electrochemical device comprising an anode, a cathode, and an electrolyte, the organic/inorganic complex coating porous separator according to the present invention may be used as a separator between the anode and the cathode.

The electrochemical device includes all devices that make electrochemical reactions. Specific examples of the electrochemical device may include all kinds of primary/secondary batteries, fuel cells, solar cells, or super capacitors. In particular, a lithium secondary battery of the secondary batteries is the most preferable.

The secondary battery device can be manufactured by a typical method known in the art, and can be manufactured by interposing the separator according to the present invention between the anode and the cathode and injecting the electrolyte.

A cathode, an anode, and an electrolyte to be applied as well as the separator of the present invention are not specifically limited and may employ those typically used in the art.

Advantageous Effects

According to the present invention, when a binder in a form of particles dispersed in a certain size in an oil-based or water-based solvent is selectively mixed with inorganic particles and then coated and dried on a porous substrate, a thus formed organic/inorganic complex coating separator can exhibit a sufficient adhesive strength without crosslinking by heat or UV, and has a higher adhesive strength with respect to the substrate as compared with the case where crosslinking caused by heat or UV occurs. Further, the organic/inorganic complex coating separator has excellent air permeability, thereby suppressing a thermal contraction rate at a high temperature, and also exhibits excellent processability.

Further, since the organic/inorganic complex coating separator of the present invention is improved in wettability with respect to an electrolyte, and, thus, ionic conductivity of lithium and electrolyte uptake can be improved.

If the separator of the present invention is applied to a battery and an electrochemical device, it is possible to manufacture an excellent secondary battery device having improved performance of a battery and improved thermal and electrochemical stability.

BEST MODE

The present invention can be modified and changed in various ways and may include various exemplary embodiments. Although preferred Examples are provided as follows for easy understanding of the present invention, the following Examples are provided just for illustrating the present invention but not for limiting the scope of the present invention.

EXAMPLES AND COMPARATIVE EXAMPLES

The property measurement methods of organic/inorganic complex coating separator prepared in the following Examples and Comparative Examples are as follows.

1. Coating Thickness Measurement Method

As a coating thickness gauge, a digimatic thickness gage 547-401 (Φ6.3 mm flat tip type, pressure of 3.5 N or less for measurement) manufactured by Mitutoyo was used for measurement, and a difference between a thickness of a coating separator and a thickness of an original film before coating was calculated.

2. Adhesive Strength Measurement Method

After a tape of 18 mm×20 mm (adhesion area) was attached onto the coating separator, a load of 2 kgf was applied thereto for 10 minutes. Then, an adhesive strength was measured with a LLOYD UTM. Herein, as for the adhesive strength, a force (gf) applied to pull a tape at a speed of 2 mm/min until the tape was detached was measured using a 180 degree peel test.

3. Gurley Measurement Method

As for gurley, a permeation time of 100 cc of air was measured using a densometer manufactured by Toyoseiki Co., Ltd. (ISO 5635/5).

4. Thermal Contraction Rate Measurement Method

A sample was cut into a size of 50 mm×50 mm, and vertical and horizontal lines (3 cm×3 cm) were drawn on a central portion of the sample. Then, the sample was left in an oven at a temperature of 150±5° C. for 1 hour. Thereafter, the sample was taken out of the oven and left at room temperature for 5 minutes or more to be cooled to room temperature. Then, lengths of the lines drawn on the central portion of the sample were measured to calculate a contraction rate with respect to the lengths before contraction.

Example 1

1-1. Preparation of Organic/Inorganic Complex Coating Porous Separator

Figure 1:
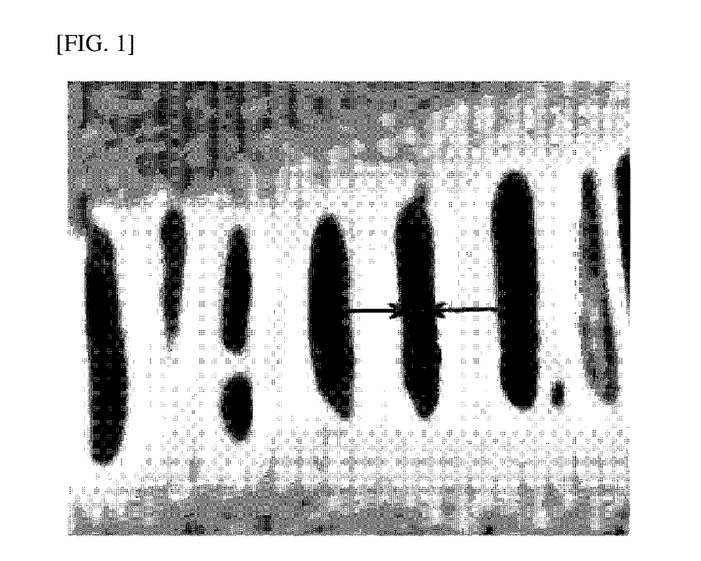
FIG. 1 illustrates a method of measuring a pore diameter of an uniaxially oriented porous separator manufactured by a dry method.
Figure 2:
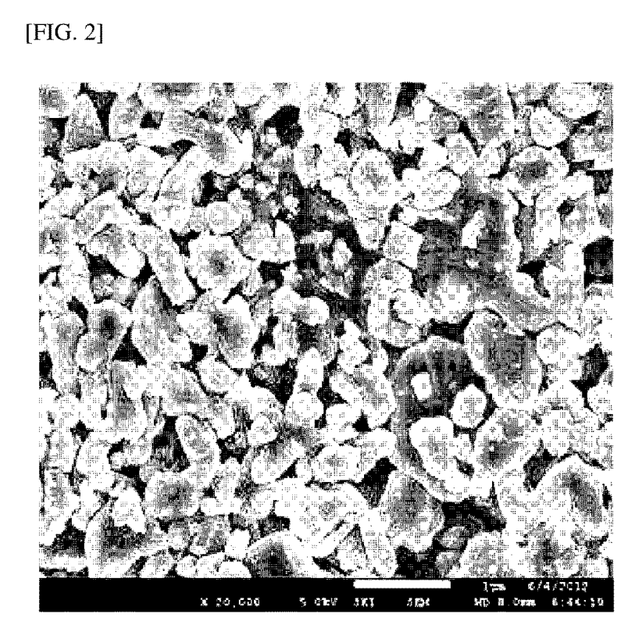
FIG. 2 is an FE-SEM image of an organic/inorganic coating porous separator prepared in Example 1.
Figure 3:
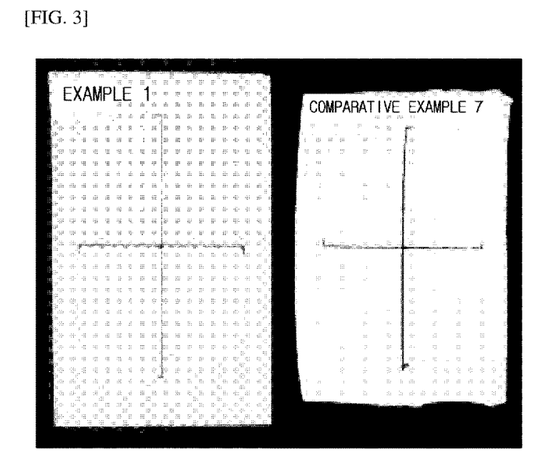
FIG. 3 is a photo illustrating a result of a thermal contraction experiment on separators, and illustrates organic/inorganic complex coating porous separators prepared in Example 1 and Comparative Example 7 after being left at 150° C. for 1 hour.

Alumina ($Al_2O_3$) as inorganic particles was added to water to be solid content 30 weight %, and a modified polyacryl polyether copolymer as a second organic binder was added in amount of 1 weight % with respect to the amount of alumina, and then, the inorganic particles were crushed to a mean particle diameter of 0.5 μm using the ball-mill for 2 hours or more and dispersed so as to prepare waterborne inorganic slurry. A waterborne styrene butadiene latex (SBL) emulsion having a mean particle diameter of dispersed binder of 80 nm is added as a binder to the slurry such that a ratio of the inorganic particles/the binder (P/B ratio) is $Al_2O_3$/SBL=40/1 (weight ratio), and with stirring for about 2 hours or more, the emulsion is uniformly dispersed within the slurry, thereby preparing a coating solution. As a porous substrate, a corona-treated uniaxially oriented polypropylene separator (porosity of 45%) having a mean pore diameter of 100 nm in a TD direction and a thickness of 14 μm was used. The coating solution was coated on both surfaces of the separator by a dip coating method, so that an organic/inorganic complex coating porous separator having a thickness of 20 μm was finally prepared. An FE-SEM image of the prepared separator was as illustrated in FIG. 1. Further, FIG. 3 illustrates a photo illustrating a result of a thermal contraction experiment on the separator.

1-2. Preparation of Lithium Secondary Battery

A coin cell type lithium secondary battery was prepared using a $LiNiCoMnO_2$-based electrode as an anode, a graphite electrode as a cathode, and an ethylene carbonate/ethyl methyl carbonate/diethyl carbonate (EC/EMC/DEC=3:2:5)-based electrolyte wherein lithium hexafluoro phosphate ($LiPF_6$) was dissolved, as an electrolyte.

Example 2

An organic/inorganic complex coating porous separator and a lithium secondary battery including the same were prepared in the same manner as Example 1 except that a mean pore diameter in a TD direction of a polypropylene separator used as a porous substrate was 130 nm.

Example 3

An organic/inorganic complex coating porous separator and a lithium secondary battery including the same were prepared in the same manner as Example 1 except that a mean pore diameter in a TD direction of a polypropylene separator used as a porous substrate was 80 nm and a mean particle diameter of a binder was 60 nm.

Example 4

An organic/inorganic complex coating porous separator and a lithium secondary battery including the same were prepared in the same manner as Example 1 except that a polyethylene separator having a mean pore diameter of 400 nm in a TD direction was used as a porous substrate.

Example 5

An organic/inorganic complex coating porous separator and a lithium secondary battery including the same were prepared in the same manner as Example 1 except that a polyethylene separator having a mean pore diameter of 400 nm in a TD direction was used as a porous substrate, and a mean particle diameter of crushed alumina was 0.8 μm and a mean particle diameter of the binder was 100 nm.

Example 6

An organic/inorganic complex coating porous separator and a lithium secondary battery including the same were prepared in the same manner as Example 1 except that a polyethylene separator having a mean pore diameter of 400 nm in a TD direction was used as a porous substrate, and a mean particle diameter of crushed alumina was 1 μm and a mean particle diameter of the binder was 100 nm.

Example 7

An organic/inorganic complex coating porous separator and a lithium secondary battery including the same were prepared in the same manner as Example 1 except that a mean particle diameter of the binder was 50 nm.

Example 8

An organic/inorganic complex coating porous separator and a lithium secondary battery including the same were prepared in the same manner as Example 1 except that a mean particle diameter of the binder was 100 nm.

Example 9

An organic/inorganic complex coating porous separator and a lithium secondary battery including the same were prepared in the same manner as Example 1 except that a polypropylene separator was used as a porous substrate without a corona treatment.

Example 10

An organic/inorganic complex coating porous separator and a lithium secondary battery including the same were prepared in the same manner as Example 1 except that a polyethylene separator having a mean pore diameter of 100 nm in a TD direction was used as a porous substrate, and a mean particle diameter of the binder was 80 nm.

Example 11

An organic/inorganic complex coating porous separator and a lithium secondary battery including the same were prepared in the same manner as Example 1 except that a polyethylene separator having a mean pore diameter of 400 nm in a TD direction was used as a porous substrate, and an acryl emulsion having a mean particle diameter of dispersed binder of 150 nm was used as binder.

Example 12

An organic/inorganic complex coating porous separator and a lithium secondary battery including the same were prepared in the same manner as Example 1 except that a polyethylene separator having a mean pore diameter of 400 nm in a TD direction was used as a porous substrate, and a PVDF emulsion having a mean particle diameter of dispersed binder of 180 nm was used as binder.

Example 13

An organic/inorganic complex coating porous separator and a lithium secondary battery including the same were prepared in the same manner as Example 1 except that as a binder, SBL (styrene butadiene latex) and CMC (carboxyl methyl cellulose) soluble in a solvent were used together.

Example 14

An organic/inorganic complex coating porous separator and a lithium secondary battery including the same were prepared in the same manner as Example 1 except that a weight ratio of alumina to a binder was 80:1.

Example 15

An organic/inorganic complex coating porous separator and a lithium secondary battery including the same were prepared in the same manner as Example 1 except that a weight ratio of alumina to a binder was 20:1.

Comparative Example 1

A lithium secondary battery was prepared in the same manner as Example 1 except that there was used a polypropylene (PP) separator (porosity of 45%) having a thickness of about 14 μm on which a coating layer was not formed.

Comparative Example 2

A lithium secondary battery was prepared in the same manner as Example 1 except that there was used a polyethylene (PE) separator (porosity of 48%) having a thickness of about 14 μm on which a coating layer was not formed.

Comparative Example 3

PVDF-HFP was added in an amount of 5 weight % to acetone and then dissolved at 40° C. for about 2 hours or more, thereby preparing a polymer compound solution. $Al_2O_3$ powder was added to this polymer compound solution such that a weight ratio (P/B ratio) of $Al_2O_3$ powder/PVDF-HFP could be 9/1 to crush and disperse inorganic particles using the ball-mill for 3 hours or more, thereby preparing a coating solution in the form of slurry. A particle diameter of the $Al_2O_3$ in the slurry after crushing can be controlled depending on a particle diameter of beads used for the ball-mill and a time for the ball-milling, but in Comparative Example 3, the slurry was prepared by crushing the inorganic particles to have a mean diameter of 0.5 μm. As a porous substrate, a corona-treated polypropylene separator (porosity of 45%) having a thickness of 14 μm was used, and the coating solution was coated on the porous substrate by a dip coating method. In this case, the dip coating method was carried out at a line speed of 5 m/min, and a coating separator (PVDF/Al$_2$O$_3$) having a thickness of 20 μm was finally prepared. A lithium secondary battery was prepared using the prepared organic/inorganic complex coating porous separator in the same manner as Example 1.

Comparative Example 4

An organic/inorganic complex coating porous separator and a lithium secondary battery including the same were prepared in the same manner as Example 1 except that a weight ratio of Al$_2$O$_3$ powder/SBL was 1/1.

Comparative Example 5

An organic/inorganic complex coating porous separator and a lithium secondary battery including the same were prepared in the same manner as Example 1 except that a weight ratio of Al$_2$O$_3$ powder/SBL was 150/1.

Comparative Example 6

An organic/inorganic complex coating porous separator and a lithium secondary battery including the same were prepared in the same manner as Example 1 except that a second organic binder was not used.

Comparative Example 7

An organic/inorganic complex coating porous separator and a lithium secondary battery including the same were prepared in the same manner as Example 1 except that that a mean particle diameter of a binder was 170 nm. FIG. 3 illustrates a photo illustrating a result of a thermal contraction experiment on the prepared separator.

Comparative Example 8

An organic/inorganic complex coating porous separator and a lithium secondary battery including the same were prepared in the same manner as Example 1 except that that a mean pore diameter of a porous substrate was 150 nm, an acryl emulsion having a mean particle diameter of dispersed binder of 250 nm was used as a binder, and a P/B ratio was 20/1.

The properties of the materials used in Examples and Comparative Examples and the properties of the prepared separators were as illustrated in the following Tables 1 to 5.

TABLE 1

| | Example 1 | Example 2 | Example 3 | Example 4 | Example 5 | Example 6 |
|---|---|---|---|---|---|---|
| Porous substrate | PP | PP | PP | PE | PE | PE |
| Substrate thickness (μm) | 14 | 14 | 14 | 14 | 14 | 14 |
| Mean pore diameter (nm) | 100 | 130 | 80 | 400 | 400 | 400 |
| Corona treatment | ○ | ○ | ○ | ○ | ○ | ○ |
| Alumina mean particle diameter (μm) | 0.5 | 0.5 | 0.5 | 0.5 | 0.8 | 1.0 |
| Binder | SB | SB | SB | SB | SB | SB |
| Binder mean particle diameter d$_{50}$ (nm) | 80 | 80 | 60 | 80 | 100 | 100 |
| P/B ratio | 40/1 | 40/1 | 40/1 | 40/1 | 40/1 | 40/1 |
| Coated surface | Both surfaces | Both surfaces | Both surfaces | Both surfaces | Both surfaces | Both surfaces |
| Coating separator thickness (μm) | 20 | 20 | 20 | 20 | 20 | 20 |
| Gurley (sec/100 cc) | 240 | 300 | 220 | 240 | 250 | 250 |
| Adhesive strength (gf) | 340 | 360 | 380 | 460 | 470 | 500 |
| MD thermal contraction rate (%@150° C., 1 hr) | | 3.8 | 3.5 | 2.0 | 2.5 | 2.8 |

TABLE 2

| | Example 7 | Example 8 | Example 9 | Example 10 |
|---|---|---|---|---|
| Porous substrate | PP | PP | PP | PE |
| Substrate thickness (μm) | 14 | 14 | 14 | 14 |
| Mean pore diameter (nm) | 100 | 100 | 100 | 100 |
| Corona treatment | ○ | ○ | X | ○ |
| Alumina mean particle diameter (μm) | 0.5 | 0.5 | 0.5 | 0.5 |
| Binder | SB | SB | SB | SB |
| Binder mean particle diameter d$_{50}$ (nm) | 50 | 100 | 80 | 80 |
| P/B ratio | 40/1 | 40/1 | 40/1 | 40/1 |
| Coated surface | Both surfaces | Both surfaces | Both surfaces | Both surfaces |
| Coating separator thickness (μm) | 20 | 20 | 20 | 20 |
| Gurley (sec/100 cc) | 240 | 260 | 240 | 250 |
| Adhesive strength (gf) | 360 | 300 | 180 | 500 |
| MD thermal contraction rate (%@150° C., 1 hr) | 3.8 | 4.5 | 5.0 | 2.0 |

TABLE 3

|  | Example 11 | Example 12 | Example 13 | Example 14 | Example 15 |
|---|---|---|---|---|---|
| Porous substrate | PE | PE | PP | PP | PP |
| Substrate thickness (μm) | 14 | 14 | 14 | 14 | 14 |
| Mean pore diameter (nm) | 400 | 400 | 100 | 100 | 100 |
| Corona treatment | ◯ | ◯ | ◯ | ◯ | ◯ |
| Alumina mean particle diameter (μm) | 0.5 | 0.5 | 0.5 | 0.5 | 0.5 |
| Binder | Acryl | PVDF | SB + CMC | SB | SB |
| Binder mean particle diameter $d_{50}$ (nm) | 150 | 180 | 80 | 80 | 80 |
| P/B ratio | 40/1 | 40/1 | 40/1 | 80/1 | 20/1 |
| Coated surface | Both surfaces | Both surfaces | Both surfaces | Both surfaces | Both surfaces |
| Coating separator thickness (μm) | 20 | 20 | 20 | 20 | 20 |
| Gurley (sec/100 cc) | 250 | 250 | 250 | 240 | 250 |
| Adhesive strength (gf) | 340 | 340 | 310 | 320 | 380 |
| MD thermal contraction rate (%@150° C., 1 hr) | 4.4 | 5.5 | 5.7 | 4.2 | 3.8 |

TABLE 4

|  | Comparative Example 1 | Comparative Example 2 | Comparative Example 3 |
|---|---|---|---|
| Porous substrate | PP | PE | PP |
| Substrate thickness (μm) | 14 | 14 | 14 |
| Mean pore diameter (nm) | 100 | 400 | 100 |
| Corona treatment | — | — | ◯ |
| Alumina mean particle diameter (μm) | — | — | 0.5 |
| Binder | — | — | PVDF-HFP |
| Binder mean particle diameter $d_{50}$ (nm) | — | — | — |
| P/B ratio | — | — | 9/1 |
| Coated surface | — | — | Both surfaces |
| Coating separator thickness (μm) | — | — | 20 |
| Gurley (sec/100 cc) | 210 | 230 | 300 |
| Adhesive strength (gf) | — | — | 80 |
| MD thermal contraction rate (%@150° C., 1 hr) | 40 | melted | 14 |

TABLE 5

|  | Comparative Example 4 | Comparative Example 5 | Comparative Example 6 | Comparative Example 7 | Comparative Example 8 |
|---|---|---|---|---|---|
| Porous substrate | PP | PP | PP | PP | PP |
| Substrate thickness (μm) | 14 | 14 | 14 | 14 | 14 |
| Mean pore diameter (nm) | 100 | 100 | 100 | 100 | 150 |
| Corona treatment | ◯ | ◯ | ◯ | ◯ | ◯ |
| Alumina mean particle diameter (μm) | 0.5 | 0.5 | 0.5 | 0.5 | 0.5 |
| Binder | SB | SB | SB | SB | Acryl |
| Binder mean particle diameter $d_{50}$ (nm) | 80 | 80 | 80 | 170 | 250 |
| P/B ratio | 1/1 | 150/1 | 40/1 | 40/1 | 20/1 |
| Coated surface | Both surfaces | Both surfaces | Both surfaces | Both surfaces | Both surfaces |
| Coating separator thickness (μm) | 20 | 20 | 20 | 20 | 20 |
| Gurley (sec/100 cc) | 1500 | 220 | 220 | 220 | 280 |
| Adhesive strength (gf) | 490 | 30 | 180 | 150 | 80 |

TABLE 5-continued

|  | Comparative Example 4 | Comparative Example 5 | Comparative Example 6 | Comparative Example 7 | Comparative Example 8 |
|---|---|---|---|---|---|
| MD thermal contraction rate (%@150° C., 1 hr) | 3.2 | 10 | 8 | 17 | 24 |

Experimental Example: Performance Evaluation of Lithium Secondary Battery

In order to evaluate performance of lithium secondary batteries prepared in Example 1 and Comparative Example 3, a capacity and a C-rate of each battery were measured.

Figure 4:
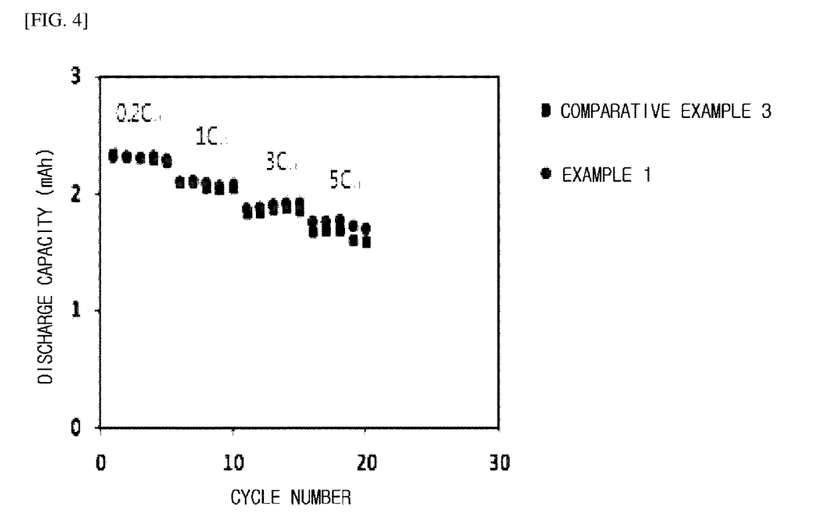
FIG. 4 illustrates a measurement result of a C-rate of organic/inorganic complex coating porous separators prepared in Example 1 and Comparative Example 3.

A cycle was carried out five times at a battery discharge speed of 0.2 C, 0.5 C, 1 C, 3 C, and 5 C, and discharge capacities thereof were schematized by C-rate characteristics as illustrated in FIG. 4.

According to a result of the experiment, as illustrated in FIG. 4, the lithium secondary battery of Example 1 including the coating separator of the present invention exhibited an excellent C-rate characteristic as compared with the battery of Comparative Example 3.

The invention claimed is:

1. A method for preparing a coating porous separator comprising:
   (a) a step of dispersing inorganic particles by adding and mixing the inorganic particles with a solvent;
   (b) a step of preparing a coating solution by adding and mixing a binder in the form of particles and a second organic binder which is dissolved in the solvent with the mixed solution obtained in the step (a); and
   (c) a step of coating and drying the coating solution obtained in the step (b) on one or more regions selected from the group consisting of a one surface, both surfaces of a porous substrate, and at least a part of a pore portion of the substrate in a single layer or multiple layers;
   wherein a mean particle diameter of the binder in the form of particles in the solvent is less than one and a half times a mean pore diameter of the porous substrate,
   wherein the binder in the form of particles which is dispersed or suspended in the solvent is one or two or more selected from latex or emulsions or suspensions formed by dispersing polymer compounds selected from the group consisting of polystyrene-based, styrene butadiene-based, nitrile-based, polyvinyl chloride-based, polyolefin-based, acryl-based, acetate-based, polyvinylidene fluoride-based, ethylene-vinyl acetate-based, polyvinyl butyral-based, polytetrafluoro ethylene-based, polyimide-based, polyethylene oxide-based, cellulose-based, polyvinyl alcohol-based, and starch-based polymers and copolymers, in an organic solvent or a water-based solvent, and
   wherein the second organic binder which is dissolved in the solvent is a modified polyacryl polyether copolymer, and
   wherein a weight ratio of the inorganic particles:the binder in the form of particles is 20:1 to 140:1.

2. The method of claim 1, wherein the mean particle diameter of the binder in the form of particles is a half or less of a mean diameter of the inorganic particles.

3. The method of claim 1, wherein the inorganic particles include one or two or more selected from the group consisting of $SnO_2$, $BaTiO_2$, $Al_2O_3$, $CeO_2$, $SiO_2$, $TiO_2$, $Li_3PO_4$, NiO, ZnO, MgO, $Mg(OH)_2$, CaO, $ZrO_2$, and $Y_2O_3$, and have a sphere shape, a plate shape, or an irregular shape having a mean particle diameter of 0.1 to 5 μm.

4. The method of claim 3, wherein the inorganic particles are $Al_2O_3$.

5. The method of claim 4, wherein the $Al_2O_3$ inorganic particles have a mean particle diameter of between 0.5 and 1.0 μm.

6. The method of claim 1, wherein the coating solution further comprises one or more additives selected from the group consisting of a polymer dispersion agent, a wetting agent, an antifoaming and defoaming agent, a leveling agent, a thickener, a rheology additive, an adhesion promoter, an additive for surface, and a UV absorber.

7. The method of claim 1, wherein the porous substrate has a thickness of 1 to 100 μm and a porosity of 5 to 90%.

8. The method of claim 7, wherein the substrate has a thickness between 1 and 30 μm and a porosity between 20 and 80%.

9. The method of claim 1, wherein the substrate has a mean pore diameter between 80 and 400 nm.

10. The method of claim 9, wherein the substrate has a thickness between 1 and 30 μm and a porosity between 20 and 80%.

11. The method of claim 9, wherein the inorganic particles include one or two or more selected from the group consisting of $SnO_2$, $BaTiO_2$, $Al_2O_3$, $CeO_2$, $SiO_2$, $TiO_2$, $Li_3PO_4$, NiO, ZnO, MgO, $Mg(OH)_2$, CaO, $ZrO_2$, and $Y_2O_3$, and have a sphere shape, a plate shape, or an irregular shape having a mean particle diameter of 0.1 to 5 μm.

12. The method of claim 11, wherein the inorganic particles are $Al_2O_3$.

13. The method of claim 12, wherein the $Al_2O_3$ inorganic particles have a mean particle diameter of between 0.5 and 1.0 μm.

14. The method of claim 1, wherein the inorganic particles have a sphere shape, plate shape, or irregular shape with a mean particle diameter of 0.1-5 μm; and, wherein the porous substrate has a thickness of 1 to 100 μm and a porosity of 5-90%.

15. The method of claim 1, wherein the porous separator further undergoes corona treatment.

16. The method of claim 15, wherein the binder has a mean particle diameter $d_{50}$ of between 50 and 180 nm.

17. The method of claim 1, wherein the porous substrate is polypropylene or polyethylene and the binder is selected from the group consisting of styrene butadiene, acryl emulsion, polyvinylidene fluoride, carboxyl methyl cellulose, and combinations thereof.

* * * * *